(12) United States Patent
McMurtry et al.

(10) Patent No.: US 6,519,863 B1
(45) Date of Patent: Feb. 18, 2003

(54) PROBE ARM FOR MACHINE TOOL

(75) Inventors: David R. McMurtry, Wotton-under-Edge (GB); Stephen E. Lummes, Stroud (GB)

(73) Assignee: Renishaw PLC, Gloucestershire (GB)

( * ) Notice: Subject to any disclaimer, the term of this patent is extended or adjusted under 35 U.S.C. 154(b) by 13 days.

(21) Appl. No.: 09/667,234

(22) Filed: Sep. 22, 2000

(30) Foreign Application Priority Data

Oct. 13, 1999 (GB) .............................. 9924083
Feb. 24, 2000 (GB) .............................. 0004217

(51) Int. Cl.$^7$ .............................. G01B 5/00; G01B 5/012
(52) U.S. Cl. .............................. 33/556; 33/503; 33/559
(58) Field of Search .......................... 33/503, 556, 559, 33/435, 465, 471, 495, 496, 497, 498, 499, 500

(56) References Cited

U.S. PATENT DOCUMENTS

| | | | |
|---|---|---|---|
| 3,230,793 A | | 1/1966 | Allison |
| 4,571,847 A | * | 2/1986 | McMurtry ................. 33/503 |
| 4,829,677 A | * | 5/1989 | Yuzuru ..................... 33/503 |
| 5,084,981 A | * | 2/1992 | McMurtry et al. ......... 33/556 |
| 5,323,540 A | * | 6/1994 | McMurtry et al. ......... 33/559 |
| 5,404,649 A | * | 4/1995 | Hajdukiewicz et al. .... 33/503 |
| 5,446,970 A | | 9/1995 | McMurtry et al. |
| 5,678,967 A | | 10/1997 | Savoie |
| 5,755,038 A | * | 5/1998 | McMurtry ................. 33/559 |
| 6,060,855 A | | 5/2000 | Matsuhashi |
| 6,275,053 B1 | * | 8/2001 | Morrison et al. .......... 33/556 |

FOREIGN PATENT DOCUMENTS

| | | |
|---|---|---|
| EP | 0 748 669 A1 | 12/1996 |
| JP | 59-65612 A | 4/1984 |
| WO | WO00/33149 | 6/2000 |

* cited by examiner

Primary Examiner—Diego Gutierrez
Assistant Examiner—Madeline Gonzalez
(74) Attorney, Agent, or Firm—Oliff & Berridge PLC

(57) ABSTRACT

A probe arm comprises a base member 10 securable to a surface of a machine tool, and a rotatable hub 12, carrying an arm member 16 with a tool-setting probe (18 FIG. 1). The hub has a portion 22 with three radial projections (26 FIG. 2) which rotates within an aperture 24 of the base which also has three inward radial projections 30. Together these projections form stops at the operative and non-operative positions of the probe. The aperture also has three axial raised areas 42 on an annular ledge 40 which support an annular should 44 on the hub. Thus there are six points of contact between the hub and base member in the operative and non-operative positions. A biasing arrangement comprises a detent plate 46 secured to the aperture and a planar spring 48 secured to the hub by its central region. Ball bearings 56 are loosely retained in two opposite lugs (54 FIG. 6) on the spring and run around the detent plate between two pairs of detent holes (58 FIG. 5). In the operative and non-operative positions, the ball bearings rest on radially-extending edges (58A FIG. 5) of the detent holes and thus the axial force of the spring also provides a component of force in a tangential direction, thereby causing a rotational force.

18 Claims, 4 Drawing Sheets

PROBE ARM FOR MACHINE TOOL

This invention relates to a mechanism for indexing to a defined rotary position. It can be used in an arm for holding a probe in a machine tool.

BACKGROUND OF THE INVENTION

It is known to mount a toolsetting probe in a machine tool. The probe is mounted to the bed or table of the machine tool, such that a cutting tool can be moved into contact with it. This enables the location of the cutting tip of the tool to be established, in order to set offsets associated with the tool for use by the numerical control of the machine.

In many machines, the toolsetting probe would get in the way if permanently mounted in the required position. Consequently, it is known to mount it on a movable arm, which in turn is mounted to the bed of the machine.

For example, our U.S. Pat. No. 5,446,970 shows such an arm, which is rotatable between an operative position and an inoperative position. The operative position is defined by elements which form a stop against further rotary motion beyond the operative position. These elements are arranged as a kinematic support, so that the operative position is defined in a precisely repeatable manner. A relatively complex arrangement of tension springs provides a biasing force acting in a circumferential direction, biasing the elements of the stop together.

SUMMARY OF THE INVENTION

One aspect of the present invention provides a rotary mechanism comprising:

a fixed member;

a rotatable member which is rotatable about an axis relative to the fixed member;

a stop between the fixed and rotatable members, which defines an index position in the rotation of the rotatable member and prevents further rotation thereof past the index position;

the rotatable member being biased by a rotational force into engagement with the fixed member at said stop when the rotatable member is in the index position;

wherein the rotational force is derived from a biasing device acting in the axial direction.

The axial biasing device may be a spring, such as a planar spring.

The rotational force may be derived from the axial force by a detent mechanism, in which a detent element is axially biased against an edge or surface which extends generally radially.

Preferably the stop comprises at least one element in each of three circumferentially spaced locations on the rotatable member; and at least one element in each of three corresponding circumferentially spaced locations on the fixed member; said elements on the fixed and rotatable members at each said location being urged together by the rotational force.

Preferably said elements on the fixed and rotatable members co-operate with each other to constrain the degrees of freedom of the rotatable member kinematically, thereby precisely defining the index position of the rotatable member.

One or more pairs of the elements on the fixed and rotatable members, forming the kinematic support, may confront each other axially, and be biased into engagement by the axial biasing device.

A second aspect of the present invention provides a probe arm for a machine tool, comprising a rotary mechanism as described above, the rotatable member comprising or carrying an arm member on which is located a probe. The probe may, for example, be a toolsetting probe.

Reference should be made to U.S. Pat. No. 5,446,970 for a discussion of the meaning of the terms "kinematic", "kinematically" and like terms, as used in this specification. These terms encompass not only kinematic supports in which point contacts are provided between the respective pairs of elements on the fixed and rotatable members, but also semi- or quasi-kinematic supports, in which there are small areas or lines of contact between the respective elements.

BRIEF DESCRIPTION OF THE DRAWINGS

A preferred probe arm according to the present invention will now be described by way of example, with reference to the accompanying drawings, wherein.

DESCRIPTION OF PREFERRED EMBODIMENTS

Figure 1:
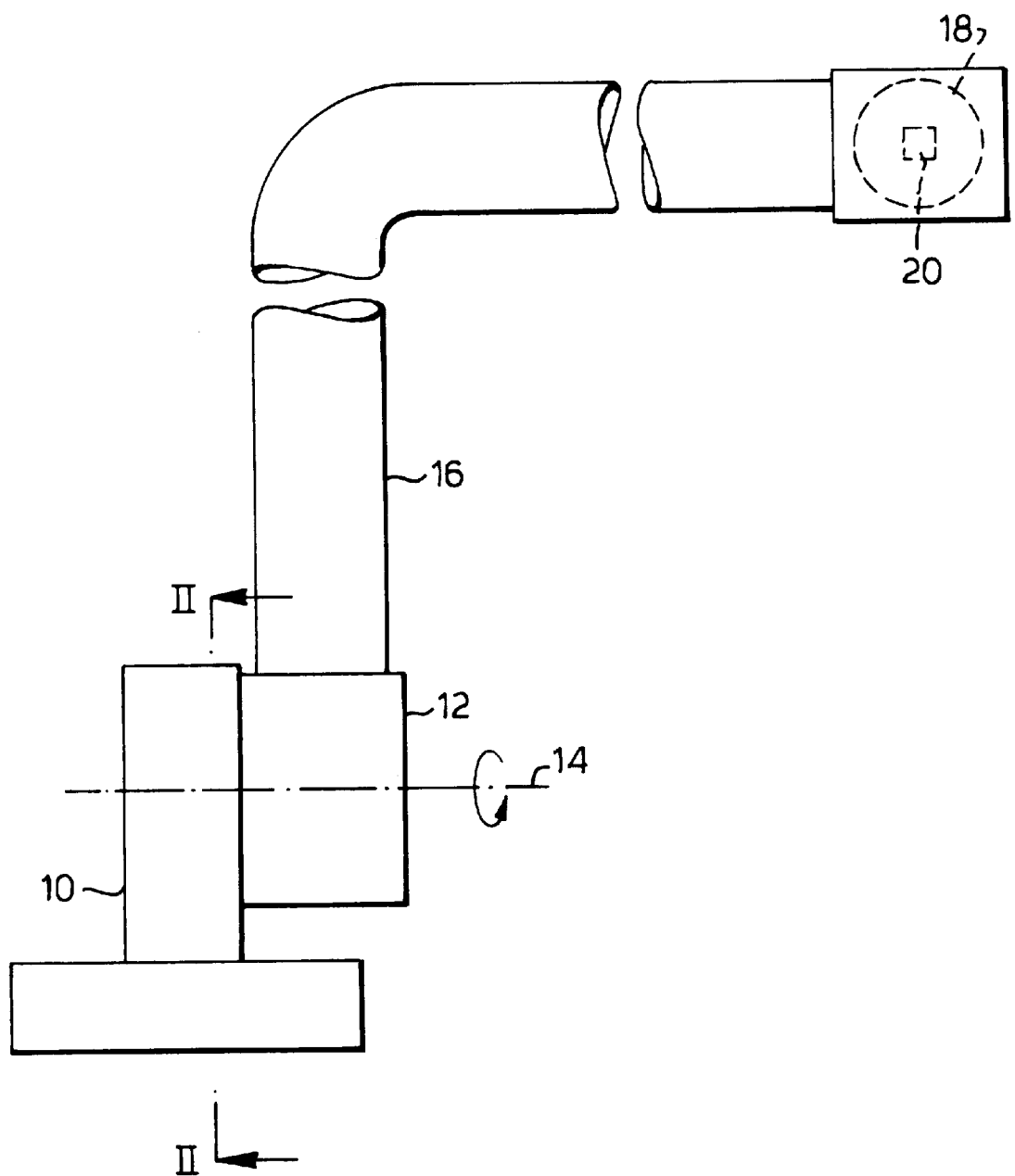
FIG. 1 is a side view of a toolsetting probe arm.

The probe arm shown in FIG. 1 comprises a fixed base member 10 and a hub 12 which is rotatable through 90° about an axis 14. The base member 10 can be secured to any suitable surface of a machine tool, such as a lathe. The hub 12 carries an arm member 16, which in turn carries at its distal end a toolsetting probe 18, having a deflectable stylus with a tip 20. Since the hub 12 is rotatable through 90°, the arm 16 can be swung from an inoperative position as shown in FIG. 1 (where it is out of the way of the normal operation of the lathe), into an operative position (where the stylus tip 20 can be accessed by a cutting tool on a turret of the lathe, for toolsetting purposes). The arm member 16 may have any desired configuration (e.g. with a right-angle bend as shown) in order to position the stylus tip conveniently.

The arm member 16 and probe 18 may have various optional features, such as disclosed in our co-pending International Patent Application No. WO00/33149.

In the present embodiment, the arm member 16 is swung between the operative and inoperative positions manually. However, it would be possible to provide a motor in the base member 10 or the hub 12 to perform this operation, e.g. as in U.S. Pat. No. 5,446,970.

Figure 2:
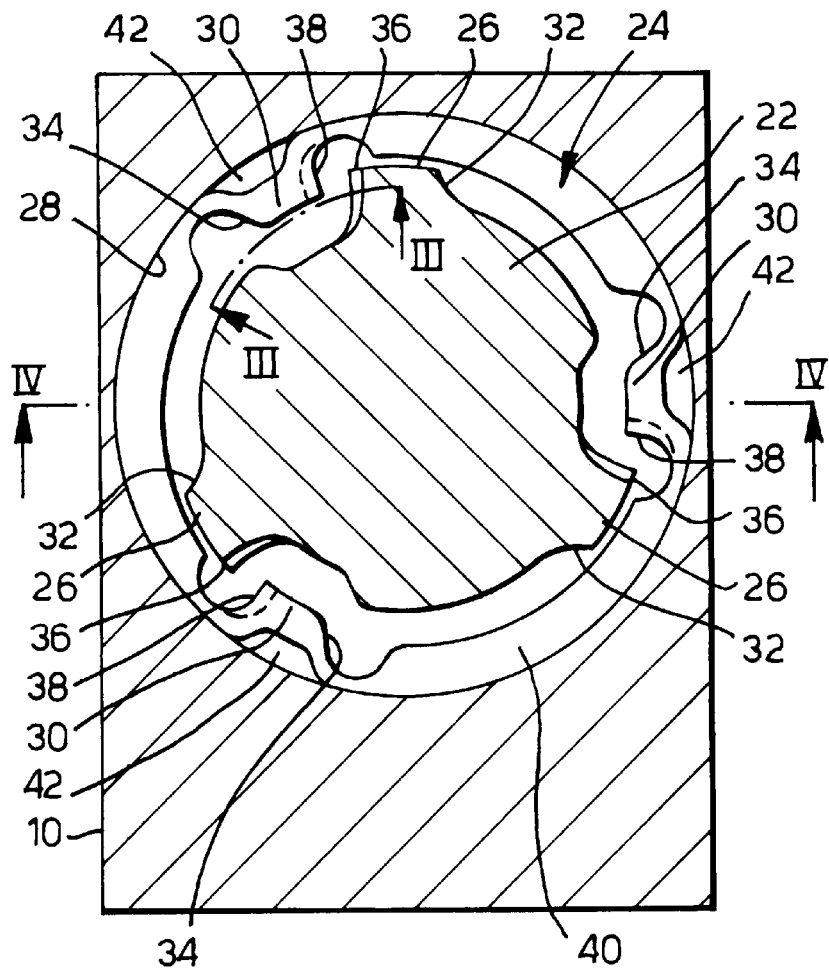
FIG. 2 is a sectional view on the line II—II in FIG. 1.
Figure 4:
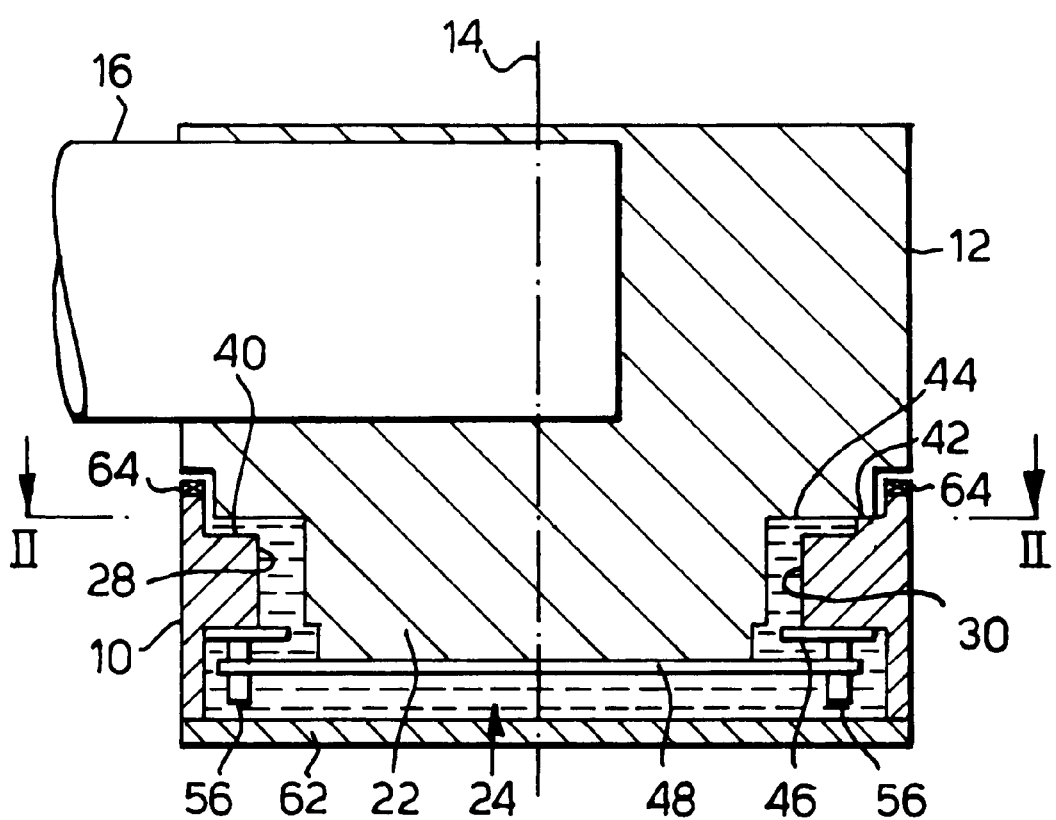
FIG. 4 is a sectional view on the line IV—IV in FIG. 2, the section line of FIG. 2 being indicated at II—II.

As best seen in FIGS. 2 and 4, the hub 12 has a specially shaped portion 22 which rotates within an aperture 24 passing through the base member 10. The portion 22 has three radial projections 26, spaced at 120° from each other. The aperture 24 has a region 28 of reduced diameter, having three radially inward projections 30, also spaced at 120°. The projections 26 extend radially beyond the inner faces of the projections 30. Consequently, the projections 26,30 together form stops at each end of the rotary travel of the hub 12 relative to the base member 10.

More particularly, in the inoperative position, edges 32 of the projections 26 on the hub 12 abut against corresponding edges 34 of the projections 30 on the base member 10. In the operative position, edges 36 of the projections 26 abut edges 38 of the projections 30. The edges 32,34,36,38 are so positioned, relative to each other, that there is 90° of travel between the operative and inoperative positions.

Figure 3:
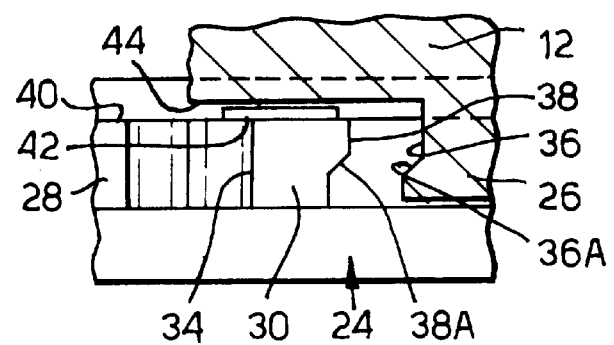
FIG. 3 is a view on the line III—III in FIG. 2.

As best seen in FIG. 3, the edges 36,38 each have respective surfaces 36A,38A formed at 45°. The projections 30,26 are so formed that it is only these 45° surfaces of the projections which come into contact in the operative position. Furthermore, although not shown in the drawings, it is advantageous to form one of the 45° surfaces of each mating pair with a slight convex curvature, so that there is a line of contact between them rather than a larger area of contact.

In the aperture 24, there is a generally annular, axially facing ledge 40, formed on one side of the region 28 of reduced diameter. The ledge 40 has three small raised areas 42, also facing axially. The shaped portion 22 of the hub 12 has an annular shoulder 44, facing axially in the opposite direction and confronting the ledge 40 as seen in FIGS. 3 and 4. The shoulder 44 is supported by the three small areas 42, both in the operative and inoperative positions, and slides over them during the rotary motion between these two positions.

In the operative position, therefore, there are six small areas of contact between the hub 12 and the base 10. These are at the three 45° surfaces 36A abutting the 45° surfaces 38A, and at the three areas 42 abutting the shoulder 44. Likewise, in the inoperative position there are six small areas of contact. These are between the respective edges 32,34, and again at the areas 42 which abut the shoulder 44.

The edges 36,38 may have surfaces positioned at an angle other than 45°. For example, the surfaces of 36 and 38 may extend vertically, i.e. 90° to the axially facing ledge 40.

In both the operative and inoperative positions, these respective areas of contact are urged into engagement with each other by biasing arrangements which will be described below. Consequently, in both positions, there is a semi- or quasi-kinematic support, which defines with good precision the position of the hub 12 and the arm 16. Importantly, this also produces a well-defined position for the probe 18 and its stylus tip 20, which is important in the operative position for accurate toolsetting.

In the operative position, the 45° surfaces 36A,38A give especially positive engagement, and as mentioned above one of them is slightly convex (giving, in theory, a line contact) to reduce the area of contact. Thus, it will be seen that the positioning accuracy is particularly well defined in the operative position, as required.

It would of course be possible to improve the kinematic support in the operative position by ensuring, as nearly as possible, that there are point contacts instead of areas of contact. For example, this could be done by replacing each of the areas 42 with a ball projecting from the surface of the ledge 40, and similarly providing a ball projecting from each of the edges 36 or from each of the edges 38.

Of course, it would also be possible to provide a quasi-kinematic support, of the type provided by the edges 32,34, in the operative position as well as in the inoperative position. Indeed, in the inoperative position a kinematic or quasi-kinematic support is not very important.

The biasing arrangements will now be described, with reference to FIGS. 4, 5 and 6.

Figure 5:
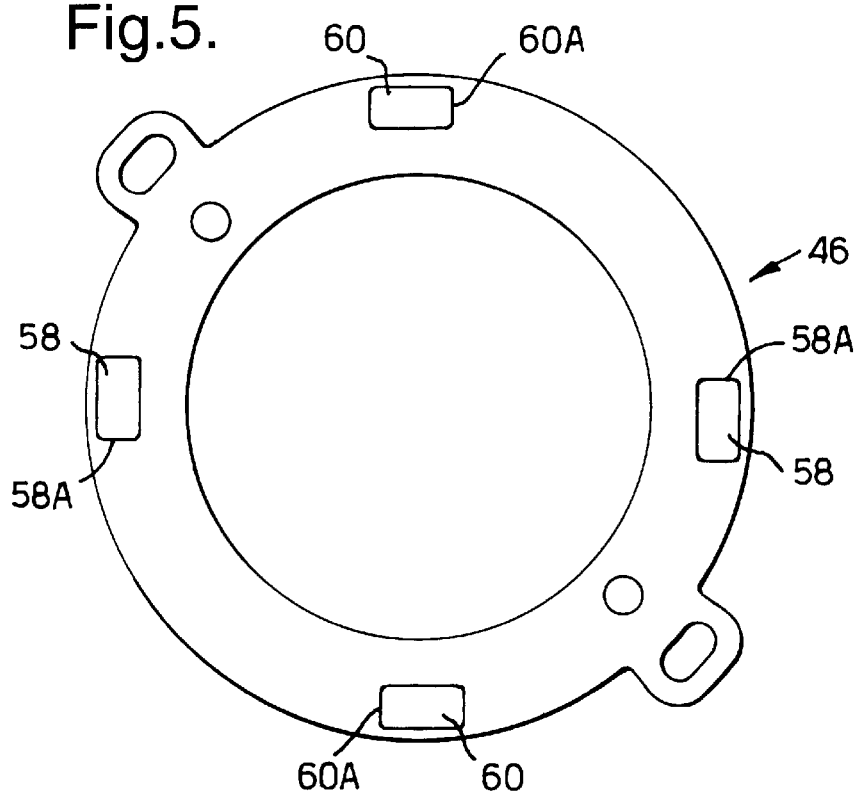
FIG. 5 is a plan view of a detent plate.

FIG. 5 shows an annular detent plate 46. As seen in FIG. 4, this is secured in the aperture 24, on the side of the region 28 of reduced diameter which is opposite the ledge 40. The detent plate 46 has two pairs of detent holes 58,60. These are arranged almost (but not quite) at 90° to each other.

Figure 6:
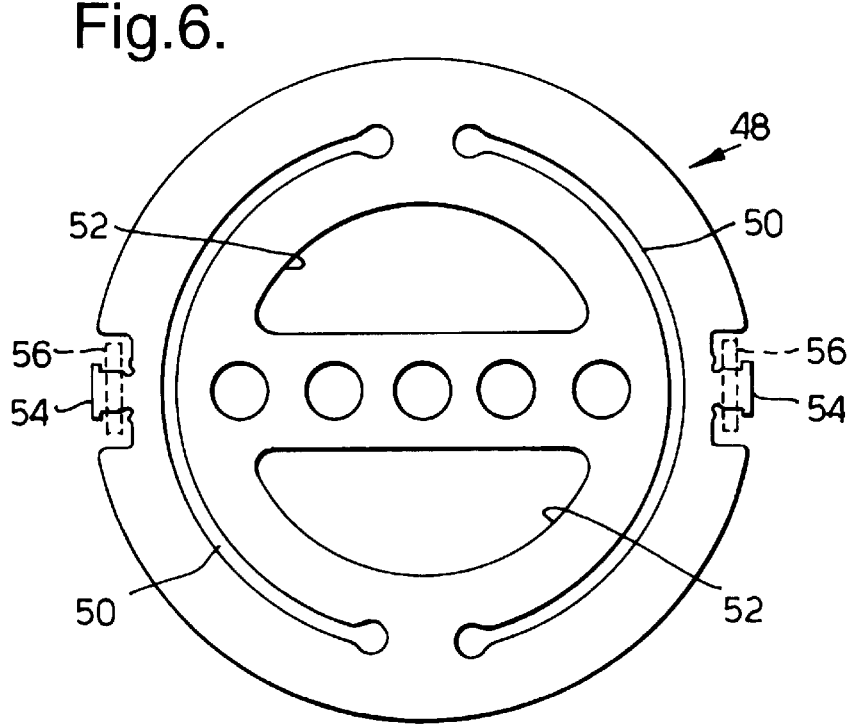
FIG. 6 is a plan view of a planar spring.

FIG. 6 shows a planar spring 48, a central region of which is secured as shown in FIG. 4 to the portion 22 of the hub 12 (via a spacer if necessary). The planar spring 48 has cut-outs 50,52 to enable it to flex and to provide the required spring force.

The planar spring has two diametrally opposed lugs 54, shaped to loosely retain respective ball bearings 56 (the positions of which are shown in broken lines in FIG. 6). The ball bearings 56 are conventional, comprising a plurality of balls trapped within a race. The lugs 54 have edges which are rounded so as to engage smoothly with the internal diameters of the ball bearings 56 in use.

When the hub 12 rotates between the operative and inoperative positions, the ball bearings 56 run around the detent plate 46 between the detent holes 58,60 respectively. As they do so, the planar spring 48 is in a flexed condition and provides an axial biasing force which urges the shoulder 44 into sliding engagement with the three raised areas 42 on the ledge 40.

In the operative and inoperative positions, the ball bearings 56 do not fall completely into the detent holes 58,60. Rather, when the hub 12 comes to the quasi-kinematic stop, the ball bearings 56 rest on generally radially extending edges 58A,60A, partially within the holes. In this condition, the planar spring 48 remains flexed and continues to provide an axial biasing force to urge the shoulder 44 into contact with the areas 42. However, when this axial force acts through the ball bearings 56 onto the edges 58A or 60A respectively, it also provides a component of force in the tangential direction. This tangential force causes a rotational force, about the axis 14, which urges the surfaces 36A,38A into engagement (in the operative position) or the edges 32,34 into engagement (in the inoperative position).

The embodiment described therefore provides similar functionality to the probe arm described in U.S. Pat. No. 5,446,970, but is significantly less complex and therefore cheaper to manufacture.

If desired, the single planar spring 48 could be replaced by a plurality of thinner such springs, laid on top of each other. For example there may be three springs, depending on their thicknesses and the desired resilience.

In the above embodiment, the planar spring 48 is preferred for providing the axial biasing force, because of its simplicity. However, other axial biasing means could be provided, such as other types of springs or even magnets.

The ball bearings 56 could be replaced by individual trapped detent balls, or even by suitably shaped axial projections from the planar spring. These would engage with the edges 58A, 60A in the operative and inoperative positions, in the same way as the ball bearings 56.

We have found it advantageous to fill the void between the hub portion 22 and the aperture 24 of the base member with a damping and lubricating oil or other damping fluid. To contain the oil, a sealing cover 62 is provided over the end of the aperture 24 which is lowermost in FIG. 4, and a seal 64 is also provided between the other end of the aperture 24 and the hub 12. Suitably the oil is of a type intended for surfaces which come under high contact pressures, e.g. gear teeth in gear boxes. The damping oil causes the projections 26,30 to come together more gently as the arm member 16 is forced into the operative and inoperative positions by the planar spring 48. This reduces jarring and helps to prevent wear and damage to the kinematic contacting surfaces. It also achieves smoother operation of the probe arm, as perceived by the user.

What is claimed is:

1. A rotary mechanism comprising:

a fixed member;

a rotatable member which is rotatable about an axis relative to the fixed member;

a stop between the fixed and rotatable members, which defines an index position in the rotation of the rotatable member and prevents further rotation thereof past the index position;

the rotatable member being biased by a rotational force into engagement with the fixed member at said stop when the rotatable member is in the index position;

including an axial biasing device, wherein the rotational force is derived from the axial biasing device acting in an axial direction of said axis of the rotatable member.

2. A mechanism according to claim 1, wherein the axial biasing device is a spring.

3. A mechanism according to claim 2 wherein said spring is a planar spring.

4. A mechanism according to claim 1, wherein the rotational force is derived from an axial force of the axial biasing device by a detent mechanism, wherein a detent element is axially biased against an edge or surface which extends generally radially from the axis of the rotatable member.

5. A mechanism according to claim 1, wherein the stop comprises at least one element in each of three circumferentially spaced locations on the rotatable member; and at least one element in each of three corresponding circumferentially spaced locations on the fixed member; said elements on the fixed and rotatable members at each said location being urged together by the rotational force.

6. A mechanism according to claim 5, wherein said elements on the fixed and rotatable members co-operate with each other to constrain the degrees of freedom of the rotatable member kinematically, thereby precisely defining the index position of the rotatable member.

7. A mechanism according to claim 6, wherein one or more pairs of the elements on the fixed and rotatable members, forming a kinematic support, confront each other axially, and are biased into engagement by the axial biasing device.

8. A mechanism according to claim 1, wherein a void is defined between the rotatable member and the fixed member around the stop and is filled with a damping fluid.

9. A mechanism according to claim 8, wherein the damping fluid is a damping and lubricating oil.

10. A probe arm for a machine tool comprising:

a fixed base member for attachment to the machine tool;

a movable arm member for carrying a probe which is rotatable about an axis relative to the fixed member;

a stop between the fixed and movable members, which defines an operative position in the movement of the movable member and prevents further movement thereof past the operative position;

the movable member being biased by a rotational force into engagement with the fixed base member at said stop when the movable member is in the operative position;

and including an axial biasing device, wherein the rotational force is derived from the axial biasing device acting in an axial direction of said axis of the movable arm member.

11. A probe arm according to claim 10 wherein the axial biasing device is a spring.

12. A probe arm according to claim 11 wherein said spring is a planar spring.

13. A probe arm according to claim 10, wherein the rotational force is derived from an axial force of the axial biasing device by a detent mechanism, wherein a detent element is axially biased against an edge or surface which extends generally radially from the axis of the movable arm member.

14. A probe arm according to claim 10 wherein the stop comprises at least one element in each of three circumferentially spaced locations on the movable arm member; and at least one element in each of the three corresponding circumferentially spaced locations on the fixed base member; said elements on the fixed and movable members at each said location being urged together by the rotational force.

15. A probe arm according to claim 14, wherein said elements on the fixed and movable members co-operate with each other to constrain the degrees of freedom of the movable member kinematically, thereby precisely defining the operative position of the movable member.

16. A probe arm according to claim 15, wherein one or more pairs of the elements of the fixed and movable members, forming a kinematic support, confront each other axially and are biased into engagement by the axial biasing device.

17. A probe arm according to claim 10, wherein a void is defined between the movable member and the fixed member around the stop and is filled with a damping fluid.

18. A probe arm according to claim 17, wherein the damping fluid is a damping and lubricating fluid.

* * * * *